(12) United States Patent
Jakstadt et al.

(10) Patent No.: US 7,822,683 B2
(45) Date of Patent: Oct. 26, 2010

(54) SYSTEM AND METHOD FOR SECURE THIRD-PARTY DEVELOPMENT AND HOSTING WITHIN A FINANCIAL SERVICES NETWORK

(75) Inventors: Eric G. Jakstadt, Smyrna, GA (US); Michael L. Waterston, Seattle, WA (US); Vasantha Badari, Seattle, WA (US); Jarrod E. Pfost, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2864 days.

(21) Appl. No.: 09/747,308

(22) Filed: Dec. 22, 2000

(65) Prior Publication Data

US 2001/0032181 A1    Oct. 18, 2001

Related U.S. Application Data

(60) Provisional application No. 60/177,321, filed on Jan. 21, 2000.

(51) Int. Cl.
*G06Q 40/00* (2006.01)
(52) U.S. Cl. .......................................... 705/40; 705/35
(58) Field of Classification Search .................. 705/34, 705/35, 40
See application file for complete search history.

(56) References Cited

U.S. PATENT DOCUMENTS

| | | | |
|---|---|---|---|
| 3,842,248 A | 10/1974 | Yamell et al. | |
| 3,852,571 A | 12/1974 | Hall et al. | |
| 4,126,779 A | 11/1978 | Jowers et al. | |
| 4,485,300 A | 11/1984 | Peirce | |
| 4,701,601 A | 10/1987 | Francini et al. | |
| 4,734,564 A | 3/1988 | Boston et al. | |
| 4,799,156 A | 1/1989 | Shavit et al. | |
| 4,823,264 A | 4/1989 | Deming | |
| 4,839,504 A | 6/1989 | Nakano | |
| 4,893,248 A | 1/1990 | Pitts et al. | |
| 4,905,826 A | 3/1990 | Martin | |
| 4,948,174 A | 8/1990 | Thomson et al. | |
| 4,949,272 A | 8/1990 | Vanourek et al. | |
| 4,979,207 A | 12/1990 | Baum et al. | |
| 4,992,940 A | 2/1991 | Dworkin | |
| 5,007,084 A | 4/1991 | Materna et al. | |
| 5,027,388 A | 6/1991 | Bradshaw et al. | |

(Continued)

FOREIGN PATENT DOCUMENTS

EP    0745947    12/1996

(Continued)

OTHER PUBLICATIONS

CBQ Signs Agreement With CitX Business Editors & Technology Writers. Business Wire. New York: Apr. 23, 1999. p. 1.*

(Continued)

*Primary Examiner*—Lalita M Hamilton
(74) *Attorney, Agent, or Firm*—Lee & Hayes, PLLC

(57) ABSTRACT

An electronic billing statement, presented as a user interface to a registered user of a server, the electronic billing statement comprising a first component, hosted by a financial service center, to navigate the user UI and invoke one or more functions of the financial service center, and a second component, hosted by a third-party, to provide detailed billing information from a biller to the registered user.

5 Claims, 12 Drawing Sheets

U.S. PATENT DOCUMENTS

| | | | |
|---|---|---|---|
| 5,091,868 A | 2/1992 | Pickens et al. |
| 5,121,945 A | 6/1992 | Thomson et al. |
| 5,197,094 A | 3/1993 | Tillery et al. |
| 5,206,488 A | 4/1993 | Teicher |
| 5,220,501 A | 6/1993 | Lawlor et al. |
| 5,223,699 A | 6/1993 | Flynn et al. |
| 5,229,584 A | 7/1993 | Erickson |
| 5,265,033 A | 11/1993 | Vajk et al. |
| 5,283,829 A | 2/1994 | Anderson |
| 5,287,270 A | 2/1994 | Hardy et al. |
| 5,325,290 A | 6/1994 | Cauffman et al. |
| 5,326,959 A | 7/1994 | Perazza |
| 5,359,509 A | 10/1994 | Little et al. |
| 5,383,113 A | 1/1995 | Kight et al. |
| 5,402,336 A | 3/1995 | Spiegelhoff et al. |
| 5,420,405 A | 5/1995 | Chasek |
| 5,424,938 A | 6/1995 | Wagner et al. |
| 5,465,206 A | 11/1995 | Hilt et al. |
| 5,473,143 A | 12/1995 | Vak et al. |
| 5,477,038 A | 12/1995 | Levine et al. |
| 5,483,445 A | 1/1996 | Pickering |
| 5,508,817 A | 4/1996 | Kunigami |
| 5,532,920 A | 7/1996 | Hartrick et al. |
| 5,550,984 A | 8/1996 | Gelb |
| 5,557,518 A | 9/1996 | Rosen |
| 5,570,465 A | 10/1996 | Tsakanikas |
| 5,574,847 A | 11/1996 | Eckart et al. |
| 5,590,197 A | 12/1996 | Chen et al. |
| 5,638,522 A | 6/1997 | Dunsmuir et al. |
| 5,644,727 A | 7/1997 | Atkins |
| 5,649,117 A | 7/1997 | Landry |
| 5,652,786 A | 7/1997 | Rogers |
| 5,655,089 A | 8/1997 | Bucci |
| 5,677,955 A | 10/1997 | Doggett et al. |
| 5,684,965 A | 11/1997 | Pickering |
| 5,699,528 A | 12/1997 | Hogan |
| 5,737,533 A | 4/1998 | De Hond |
| 5,761,650 A | 6/1998 | Munsil et al. |
| 5,764,916 A | 6/1998 | Busey et al. |
| 5,781,550 A | 7/1998 | Templin et al. |
| 5,832,460 A | 11/1998 | Bednar et al. |
| 5,842,185 A | 11/1998 | Chancey et al. |
| 5,848,400 A | 12/1998 | Chang |
| 5,848,412 A | 12/1998 | Rowland et al. |
| 5,848,800 A | 12/1998 | Metzler et al. |
| 5,870,724 A | 2/1999 | Lawlor et al. |
| 5,884,284 A | 3/1999 | Peters et al. |
| 5,884,288 A | 3/1999 | Chang et al. |
| 5,903,881 A | 5/1999 | Schrader et al. |
| 5,920,847 A | 7/1999 | Kolling et al. |
| 5,924,077 A | 7/1999 | Beach et al. |
| 5,933,811 A | 8/1999 | Angles et al. |
| 5,951,648 A | 9/1999 | Kailash |
| 5,956,700 A | 9/1999 | Landry |
| 5,963,924 A | 10/1999 | Williams et al. |
| 5,963,925 A | 10/1999 | Kolling et al. |
| 5,974,146 A | 10/1999 | Randle et al. |
| 5,978,577 A | 11/1999 | Rierden et al. |
| 5,978,780 A | 11/1999 | Watson |
| 5,978,840 A | 11/1999 | Nguyen et al. |
| 6,026,374 A | 2/2000 | Chess |
| 6,032,133 A | 2/2000 | Hilt et al. |
| 6,035,281 A | 3/2000 | Crosskey et al. |
| 6,044,405 A | 3/2000 | Driscoll, III et al. |
| 6,055,567 A | 4/2000 | Ganesan et al. |
| 6,058,373 A | 5/2000 | Blinn et al. |
| 6,058,413 A | 5/2000 | Flores et al. |
| 6,070,150 A | 5/2000 | Remington et al. |
| 6,073,143 A | 6/2000 | Nishikawa et al. |
| 6,138,112 A | 10/2000 | Slutz |
| 6,199,076 B1 | 3/2001 | Logan et al. |
| 6,209,048 B1 | 3/2001 | Wolff |
| 6,219,669 B1 | 4/2001 | Haff et al. |
| 6,233,602 B1 | 5/2001 | Van Venrooy et al. |
| 6,240,444 B1 | 5/2001 | Fin et al. |
| 6,289,322 B1 | 9/2001 | Kitchen et al. |
| 6,292,789 B1 | 9/2001 | Schutzer |
| 6,304,857 B1 | 10/2001 | Heindel et al. |
| 6,373,950 B1 | 4/2002 | Rowney |
| 6,408,284 B1 * | 6/2002 | Hilt et al. ...................... 705/40 |
| 6,493,680 B2 | 12/2002 | Logan et al. |
| 6,493,685 B1 | 12/2002 | Ensel et al. |
| 6,968,319 B1 | 11/2005 | Remington et al. |
| 7,386,522 B1 | 6/2008 | Bigus et al. |
| 2004/0167853 A1 | 8/2004 | Sharma |

FOREIGN PATENT DOCUMENTS

| | | |
|---|---|---|
| JP | 2000113089 | 4/2000 |
| WO | WO 91/16691 | 10/1991 |
| WO | WO 93/08545 | 4/1993 |
| WO | WO 96/08783 | 3/1996 |
| WO | WO 97/24680 | 7/1997 |

OTHER PUBLICATIONS

VeriFone and Portal to Deliver Integrated Payment and Billing Solution for ISPs Business Editors. Business Wire. New York: Sep. 28, 1998. p. 1.*

Orr, Bill, "Electronic bill paying shows signs of soaring", ABA Banking Journal, May 1997, pp. 42, 47-48, 50.

Brown, Bob, "TI, SW Bell Unite in EDI Billling Trial", The American City, Aug. 1963.

Vandenengel, Gerry, "Cards on the Internet-Advertising on a $3 bill", World Card Technology, Feb. 1995, pp. 46-48.

"A Different Drummer on the Data Highway", American Banker, May 12, 19995, 2 pages.

Meredith, Robin, "Internet Bank Moves Closer to Virtual Reality", USA Today, May 5, 1995.

Strassel, Kim, "Dutch Software Concern Experiments With Electronic 'Cash' in Cyberspace", Wall Street Journal, Apr. 17, 1995.

Rosen, Nick, "Cash just isn't flexible enough", Daily Express, Feb. 10, 1995.

Gullo, Karen, "Electronic Bill Payment", American Banker, Jan. 27, 1992.

"Management Utility Billing" Jul./Aug. 1979, 5 pages.

Myers, Edith, "Banking on PCs", Datamation, 6 pages.

Gullo, Karen, "Citicorp Device is called pivotal for home banking", American Banker, Mar. 1, 1990.

"Newsnet Reference Guide 1994", Newsnet Inc., 945 Haverford Road, Bryn Mawr, PA 19010.

Palmer, James and Gaj, Steven, "Consolidated Third Party Collections", Dept. of Veterans Affairs Medical Center, Brecksville, Ohio, Mumps Computing, Jun. 1997, pp. 12-16.

Briere, Daniel and Chris Finn, "Footing the Bill", Network World, vol. 9, No. 21, May 25, 1992.

White, George, "Consumer Bill Payment—"Front end" Overview", White Papers, Inc., Apr. 22, 1992, 3 pages.

Pence, Daniel M., "TV Answer", Electronic Payment Products, TV Answer, Inc., Reston, Virgina, 9 pages.

"New Technologies in Consumer Bill Payment", Scanfione by US Order, 9 pages.

Mila, Paul, Director of Operations, "Online Resources", McLean, Virgina, 4 pages.

Pope, Dennis, Asst. Vice President, EFT Project Manager, Manufacturers Hanover Trust Company, New York, New York, 5 pages.

White, George, "Bill Payment Initiation From Retail Stores", White Papers, Inc., Apr. 22, 1992, 2 pages.

"System and Method for Paying Bills Electronically", 7 pages.

Manelski, Dr. Dennis, "Bill & Pay Minitel-Consumer Bill Payments Overview", Minitel USA, 880 7th Ave., New York, NY, Apr. 22, 1992.

"More Diversity: Information Services Stress Partnerships", Communications Daily, vol. 12, No. 124, p. 2, Jun. 26, 1992, 2 pages.

"Account Acquisitions", A/S/M Communications, Inc., Adweek, May 3, 1993.

Youngblood, Dick, Staff Writer, "Some hung up about paying bills via computer", Star Tribune, Minneapolis, MN, May 23, 1993, 3 pages.

Alexander, Steve, "Community Link to Shift its marketing focus from masses to special interest", UMI Inc., Aug. 13, 1993, 3 pages.

Oslund, John, Staff Writer, "Ready to Score—Big Game Offers US West a chance to show off new information Service", Star Tribune, Jan. 24, 1992, 3 pages.

"Sprint Considers Single Bill", Communications Week, Dec. 24, 1990, p. 27.

Pfitsinger, William, "Consolidate Your Utility Bills . . . ", The American City, Aug. 1963, pp. 80-81.

"A Player Goes After Big Bucks in Cyberspace", American Banker, May 5, 1998.

Sirbu, Marvin and Tygar, J.D., "NetBill: An Internet Commerce Service Optimized for Network Delivered Services", Engineering and Public Policy Dept. and Computer Science Dept., Carnegie Mellon University, Pittsburg, Pennsylvania, Feb. 27, 1995, pp. 1-12.

Kutler, Jeffery, "Cash Card Creator Looking Beyond Mondex", Feb. 9, 1995.

Post, David, "E-Cash: Can't live with it, Can't live without it", The American Lawyer, Mar. 1995, pp. 116-117.

Piskora, Beth, "Debit Cards Seen Poised for New Markets", American Bankers, Mar. 7, 1995.

Bank, David, "Cash, Check, Charge—What's next?", Seattle Times, Mar. 6, 1995, 4 pages.

Cortese, Amy, "Cyberspace—Crafting software that will let you build a business out there", Business Week, Feb. 27, 1995, 7 pages.

Mullin, Rick, "The Upward Evolution of Batch Automation", Chemical Week, vol. 161, Issue 37, p. 39, 2p, 1 graph, 4c, Oct. 6, 1989.

Zabback et al., "Office Documents on a Database Kernal—Filing, Retrieval, and Archiving-", Database Research Group, Dept. of Computer Science Swiss Federal Institute of Technology, CH-8092, Zurich, pp. 261-270.

PR Newswire, "Template Software Strengthens Core Product Family With Ease-of-Use and Functional Enhancements that Promote Unparalleled Software Reuse", Dialog File 621, Access No. 01544425, Jun. 23, 1997.

Richard Crone, "Who Does MSFDC Really serve?", Dialog File 696, Access No. 00581887, vol. 3, Issue 25, Dec. 16, 1997.

Business Wire, "Just in time solutions introduces BillCast Family of products for open internet billing", Business Wire, May 18, 1998.

Anonymous, "Another Player Enters the Bill Presentment Game (Online Resources & Communications teams with Electronic Funds & Data Corp. and American Payment Systems to develop online bill presentment and bill payment service)", Report on Home Banking & Financial Services, vol. 2, No. 12, p. 3, Mar. 28, 1997.

Anonymous, "Bold moves (First Data Corp and Microsoft corp are forming bill-pay and bill-presentment company, challenging Visa, Integrion and Checkfree)", Cards International, N. 181, p. 5, Jul. 31, 1997.

Anonymous, "Billers Benefit When the Bill's Not in the Mail", Bank Network News, V. 15, N. 8, pp. 4-5, Sep. 11, 1996.

Jones, D., "CHAPS—ring around the city", Journal: Banking World, vol. 1, No. 5, p. 11-13, Nov. 1983.

"Sterling Commerce Announces New Consumer Payment Consolidation Software for Banks; Vector: Biller Lets Banks Solve Costly Manual Handling of Consumer Payment", Business Wire, p09160262, Sep. 16, 1996.

Large, Jack, "Which Method Should you settle for?", Corporate Finance; London, Sep. 1997.

"Putting a Charge Into Electronic Bill Payments", Aug. 28, 1996, Bank Network News, vol. 15, No. 7, p. 3.

"Toward Better Bill-Payment Processing", Apr. 1996, Bank Technology News, vol. 9, No. 4, p. 10.

"E-Bill Customers Over the Internet", Jan. 8, 1996, Twice, vol. 11, No. 1, p. 142.

"Visa to Offer Electronic Bills", Jul. 17, 1995, Interactive Age, vol. 2, No. 19, p. 4.

Messena et al., "Building and Hosting Design—time ActiveX Controls"—Internet Reference, HTTP://www.microsoft.com, Jan. 21, 1997.

Tompkins et al., "HTML Design-time",—Internet Reference, HTTP://www.microsoft.com, Feb. 12, 1997.

Microsoft Press Computer Dictionary Third Edition, p. 240, Microsoft Press 1997, 3 pages.

"US Code Collection", Title 15, Chapter 41, Subchapter I, retrieved on Jun. 18, 2001at <<http://www.4.law.cornell.edu/uscode/html/uscode15/usc_sec_15_00001666----00-.html>> pp. 3.

"First Union and Derivion Team Up to Deliver Electronic Billing", Retail Delivery News, Potomac, vol. 5, Iss 2, Jan. 19, 2000, p. 1.

"In Brief: Eleven More Banks Join Spectrum Biller Network", American Banker, New York, NY, vol. 164, Iss 235, Dec. 9, 1999, p. 6.

"Intuit Teams with CyberBills to Bring Consumers the Ability to View and Pay All Their Bills Through Quicken.com(R)", PR Newswire, New York, Oct. 21, 1999, p. 1.

* cited by examiner

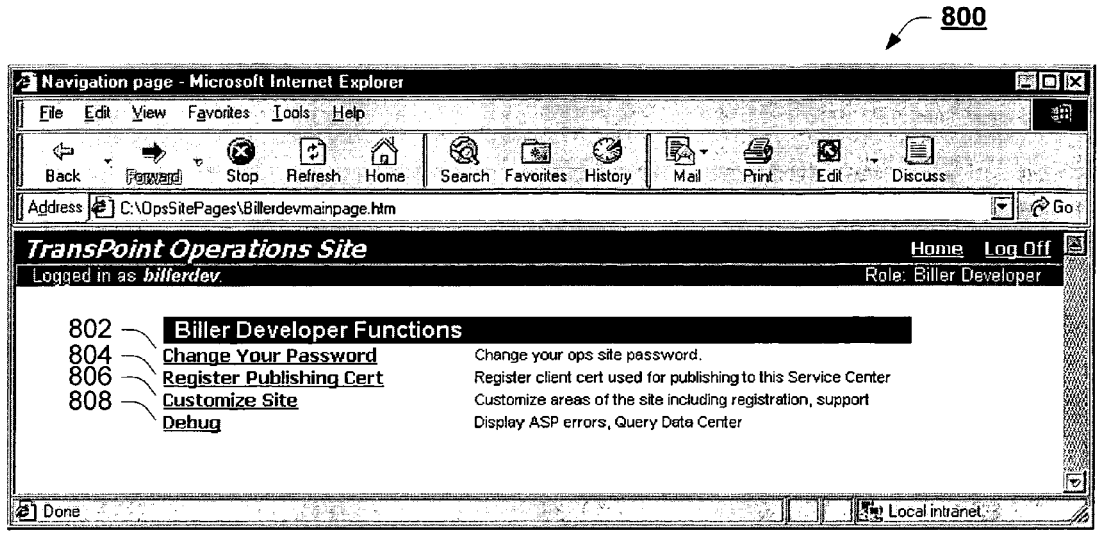
Fig. 8
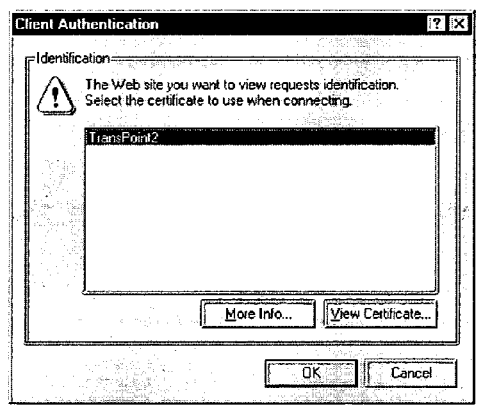
Fig. 9
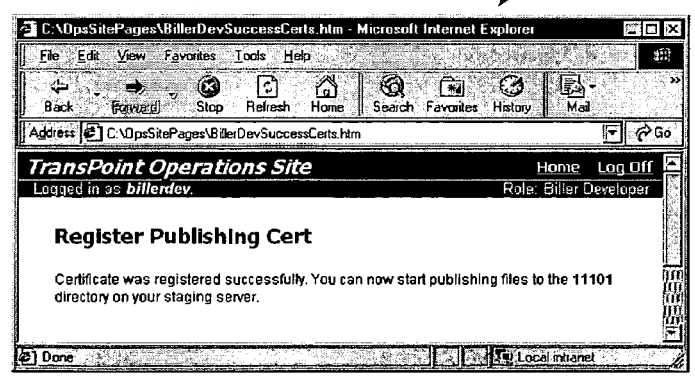

SYSTEM AND METHOD FOR SECURE THIRD-PARTY DEVELOPMENT AND HOSTING WITHIN A FINANCIAL SERVICES NETWORK

This application claims express priority to U.S. Provisional Application No. 60/177,321 entitled A System and Method for Secure Third-Party Development and Hosting within a Financial Services Network by Badari, et al. and filed on Jan. 21, 2000.

TECHNICAL FIELD

This invention generally relates to electronic bill presentment and payment (EBPP) systems and, more particularly, to systems and methods for secure third-party content development and hosting within a financial services network.

BACKGROUND

The concept of buying goods on "credit", or a promise for future payment, is not new. Today, nearly everyone in the industrial world is familiar with receiving bills for goods and services. Every month, like clockwork, millions of consumers receive bills for goods and services. For convenience, the term "consumer" is used throughout this document to represent both a typical person who consumes goods and services as well as a business that consumes goods and services.

At the end of each billing cycle, a biller typically generates a bill or statement for each consumer account having a positive or negative account balance, or having transactions that yielded a zero balance. As used herein, a "biller" is any party that originates billing statements for goods or services rendered to the consumer. Examples of billers are utilities, government, merchants, and intermediate billing services such as banks. The printed billing statement is typically customized according to the biller's preferences. For example, it is common for billing statements to be printed on colored paper, display the biller's logo, provide a billing summary, and show itemized transactions. This information is organized in a custom format that is unique to and controlled by the biller.

The biller also creates remittance information that associates the consumer account with the bill and any payment toward the bill. The remittance information is typically in the form of a detachable stub or coupon that the consumer detaches from the billing statement and returns along with the payment. This remittance stub is also customized according to the biller's preferences.

Recently, electronic bill presentment and payment (EBPP) systems have been developed to automate this process of bill delivery and payment. Companies such as Microsoft, Checkfree and Visa, Inc. are developing products in this space, the result of which heretofore has been an associated number of closed, proprietary EBPP systems. One such system is described in U.S. Pat. No. 5,465,206, entitled "Electronic Bill Pay System," which issued Nov. 7, 1995 and is assigned to Visa International.

The Visa bill payment system permits bills to be sent by billers to consumers via U.S. mail or electronically via email. Unfortunately, the Visa system suffers from a number of drawbacks. First, the email message containing the bill must conform to requirements imposed by Visa. This requirement stems from the need to route remittance information back to the biller through the VisaNet® network (one of the four Automated Clearing Houses (ACH) used by financial institutions to clear transactions between financial institutions). Thus, the biller has little or no control over the format concerning how the bill is presented to the customer, but must instead accommodate a format compatible with this network.

Second, the Visa system is designed to support the presentment of "bills" from corporate billers, and would not accommodate the myriad of financial transactions conducted among and between consumers. Third, these prior art EBPP systems (e.g., Visa, Checkfree, etc.) have not be been designed for interoperability. Currently, there is no solution available to integrate all of the users from these disparate EBPP systems into a common, ubiquitous network.

These limitations are significant in a number of respects, the most notable of which are the cost and responsiveness of such prior art electronic financial systems. Moreover, the biller must provide the Visa system with a significant amount of information, which the consumer would likely deem to be confidential. Many billers do not typically wish to share this information with third parties (e.g., the Visa system) for fear that the confidential information may be breached, resulting in fraud.

Recently, communication protocols have been introduced, i.e., the Open Financial Exchange (OFX) and, more recently the Internet Financial Exchange (IFX), as a means through which the disparate, proprietary financial networks can communicate with one another. While these protocols enable billers and financial networks to communicate among one another, it does not provide a framework which enables billers to develop content within the financial networks. While it is known that some EBPP systems enable a biller to customize the billing statement presented to the consumer, it does not provide the biller with unilateral control over the content and format of the bill. Rather, these prior art systems provide the billers with a "template", which the biller can populate to generate their "customized" bill. The problem, however, is that while the content is unique to the individual biller, the form is not. Quite simply, none of the prior art EBPP systems enable a biller to develop or host their own content, accessible on or through the EBPP system.

Thus, a system and method for secure third-party content development and hosting within a financial services network is required, unencumbered by the limitations commonly associated with prior art development and presentment architectures. Just such a solution is provided below.

SUMMARY OF THE INVENTION

This invention concerns a system and method for secure third-party content development and hosting within a financial services network. According to a first aspect of the present invention, an electronic billing statement is presented as a user interface to a registered user of a server, the electronic billing statement comprising a first component, hosted by a financial service center, to navigate the user UI and invoke one or more functions of the financial service center, and a second component, hosted by a third-party, to provide detailed billing information from a biller to the registered user.

BRIEF DESCRIPTION OF THE DRAWINGS

The same reference numbers are used throughout the figures to reference like components and features.

FIG. 8 graphically illustrates an example user interface provided by the secure development system enabling a biller to establish and manage a development account on the system;

FIG. 9 graphically represents an example user interface provided by the secure development system enabling a biller administrator to create a development certification for a developer to use the secure development system;

DETAILED DESCRIPTION

This invention concerns a system and method facilitating personal electronic financial transactions with anyone, including non-users of the system and methods, via an email system. In this regard, the present invention overcomes a number of the limitations commonly associated with the prior art including, in particular, the aggregation problem. It will be appreciated, from the description to follow, that the present invention builds upon an innovative electronic bill presentment and payment system first described in presently pending U.S. patent application Ser. No. 09/459,219 entitled "Electronic Bill Presentment and Payment System with Bill Dispute Capabilities" filed Dec. 10, 1999 to Remington et al., which is a continuation of U.S. patent application Ser. No. 6,070,150 entitled "Electronic Bill Presentment and Payment System" filed Oct. 18, 1996 to Remington et al., the disclosure of which being expressly incorporated herein by reference. In describing the present invention, example network architectures and associated methods will be described with reference to the above drawings. It is noted, however, that modification to the architecture and methods described herein may well be made without deviating from the present invention. Indeed, such alternate embodiments are anticipated within the scope and spirit of the present invention.

Example System Architecture

Example Data Network

Figure 1:
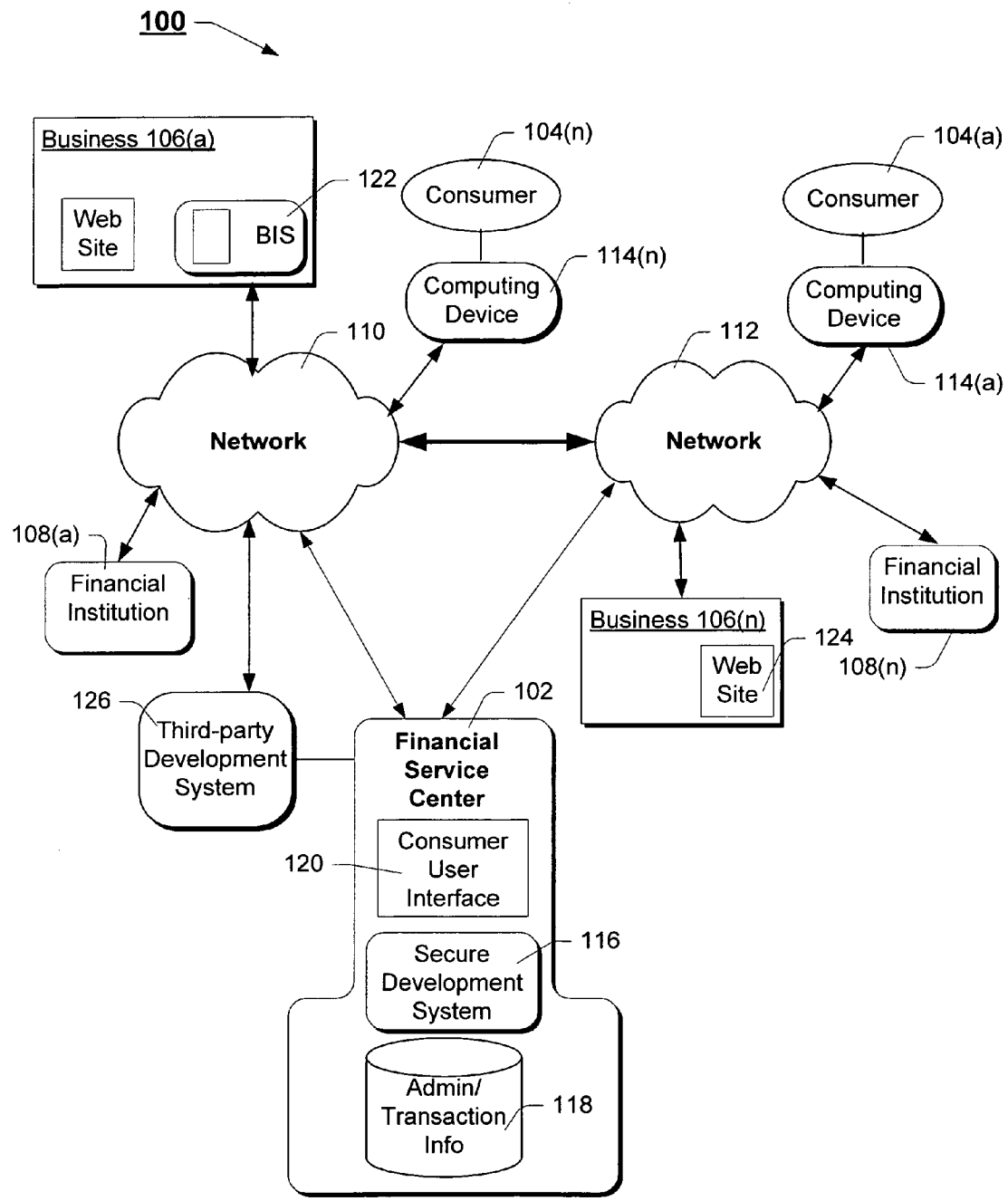
FIG. 1 is a diagrammatic illustration of a data network incorporating the teachings of the present invention.

FIG. 1 illustrates an example network 100 including an innovative financial service center (FSC) 102 including a secure third-party content development system 116. The secure third-party development system 116 enables third-parties (e.g., billers, technical consultants for billers, etc.) to develop content (e.g., application server pages), which is provided to consumers through the innovative FSC 102. Unlike prior art EBPP systems, the secure third-party development system 116 provides billers with substantial control over the form and substance of content provided to consumers via the FSC 102 by allowing the billers to author and/or host a portion of the content provided to the consumers.

With continued reference to FIG. 1, network 100 is comprised of a number of network participants including consumers 104(a) . . . (n), billers/businesses 106(a) . . . (n), and financial institutions 108(a) . . . (n) each communicatively coupled to the FSC 102 via one or more networks 110 and 112. As used herein, networks 110 and 112 are intended to represent a wide variety of networks and communication technologies. In this regard, networks 110 and 112 may well comprise, for example, public networks (Internet), private networks (enterprise wide area networks (WAN)), data networks and communication networks (public switched telephony network (PSTN), cellular telephony network, and the like). In this regard, network 100 is intended to represent a composite of any number of networks through which participants can access and benefit from the innovative services of FSC 102. Due to the confidential nature of the information and transactions, however, security measures are taken when communicating over public networks. According to one embodiment, for example, when the user is communicating with the FSC 102 via the Internet, FSC 102 employs the well known secure HyperText Transfer Protocol (HTTPS).

It will be appreciated that each of the network participants accesses and utilizes the resources of network 100 through a computing platform. Accordingly, consumers 104(a) . . . (n) are depicted as communicatively coupled to network 100 via computing devices 114(a) . . . (n), respectively. Similarly, businesses 106(a) . . . (n), financial institutions 108(a) . . . (n), and third-party content developer 126 also access the resources of network 100 through one or more computing devices. For ease of illustration and explanation, the computing interface for billers/businesses 106, financial institutions 108 and third-party content developer 126 have been omitted from FIG. 1 so as to not obscure the innovative aspects of the present invention. For purposes of this discussion, use of the term "consumer", "business", "financial institution", "user" or "network user" are each intended to represent the respective entity as well as a suitable computing interface.

As used herein the computing devices used by network users are intended to represent a broad range of computing devices known in the art. As will be shown with reference to FIG. 5, a computing device, e.g., 114, does not require any special features or capability other than a browser to access and utilize the features of FSC 102. Similarly, any number of typical personal computer systems may well be used to develop content for publication via FSC 102 using any of a number of well known application server pages (ASP) development tools such as, for example, FrontPage 2000 offered by Microsoft Corporation of Redmond, Wash. In this regard, computing devices 114(a) ... (n) are intended to include, but are not limited to, personal computers, electronic kiosks, personal digital assistants (PDAs), wireless telephones, wireline telephones, thin-client terminals, and the like through which a user may interact with email system 102.

FSC 102 is introduced in FIG. 1 as comprising the secure development system 116, a storage device 118 to store and maintain administrative and transactional information, and a consumer user interface 120. According to one implementation, to be described more fully below, FSC 102 is implemented using one or more computer systems, or data servers, which work in cooperation to provide the innovative services described herein. It will be appreciated, from the discussion to follow, that the innovative aspects of the FSC 102 may well be embodied in hardware, e.g., analog or digital circuitry, or in software executed by one or more processor(s) of the computer system(s) to implement the described functions.

As will be developed more fully below, secure third-party development system 116 enables a developer to write and automatically validate content for publication to consumers through FSC 102. According to one aspect of the invention, the developed content may also redirect an accessing consumer's browser (or other user interface executing on a computing platform) to render content hosted from a billers computer system(s) 106. That is, the secure third-party development system 116 enables billers to author and/or host their own content for publication through FSC 102.

As introduced above, storage medium 118 stores and maintains administrative and transaction information for use by FSC 102. As will be described in greater detail below, the administrative information may well contain a plethora of information regarding the biller, consumers and their accounts, and third-party developers. The transactional information provides a consumer with bill summary information, payment information, status information and the like. As used herein, storage medium 118 is intended to represent any of a number of mass storage devices including, but not limited to, magnetic hard disk drive(s), optical disk drives, compact disk (CD) read-only memory (ROM) drives, digital versatile disk (DVD) drives, redundant array of inexpensive disk (RAID) systems, tape drives, and the like. Moreover, although depicted as a single database within a single storage device 118, it will be appreciated that FSC 102 may utilize a number of storage mediums 118 comprising a plurality of databases to maintain administrative and transactional information.

Consumer user interface (UI) 120 is intended to represent any of a broad category of means by which a consumer can access and utilize the financial transaction features of FSC 102. According to one embodiment, consumer UI 120 is a web page with links that enable a registered user to access and manage financial accounts and conduct financial transactions with anyone (e.g., registered user's and non-user's alike). According to the teachings of the present invention, secure third-party development system 116 enables billers to create and/or host content presented to a consumer via the consumer UI 120. Although described with respect to a graphical, web based UI, it is to be appreciated that alternate UI's may well be utilized without deviating from the scope and spirit of the present invention.

As shown, billers/businesses 106(a) ... (n) may access (and be accessed from) FSC 102 via the network in any of a number of alternate means. According to one implementation, business 106(a) may utilize a legacy biller integration system (BIS) 122 to send batch billing statements to FSC 102 for presentment to and payment by consumers 104(a) ... (n). According to one innovative aspect of the invention, billers 106(a-n) incorporating the teachings of the present invention may utilize a "thin" batch billing schema, to be described more fully below. Examples of innovative EBPP systems incorporating BIS technology are provided in U.S. Pat. No. 6,070,150 to Remington et al. described above; U.S. Pat. No. 6,128,603 to Dent, et al., entitled Consumer-Based System and Method for Managing and Paying Electronic Billing Statements; U.S. Pat. No. 6,304,857 to Heindel, et al., entitled Distributed Electronic Billing System with Gateway Interfacing Biller and Service Center; and U.S. patent application Ser. No. 09/093,958 to Keith, et al., entitled Parcel Manager for Distributed Electronic Billing System the disclosures all of which being expressly incorporated herein by reference.

Example Secure Third-party Content Development Systems

Figure 2A:
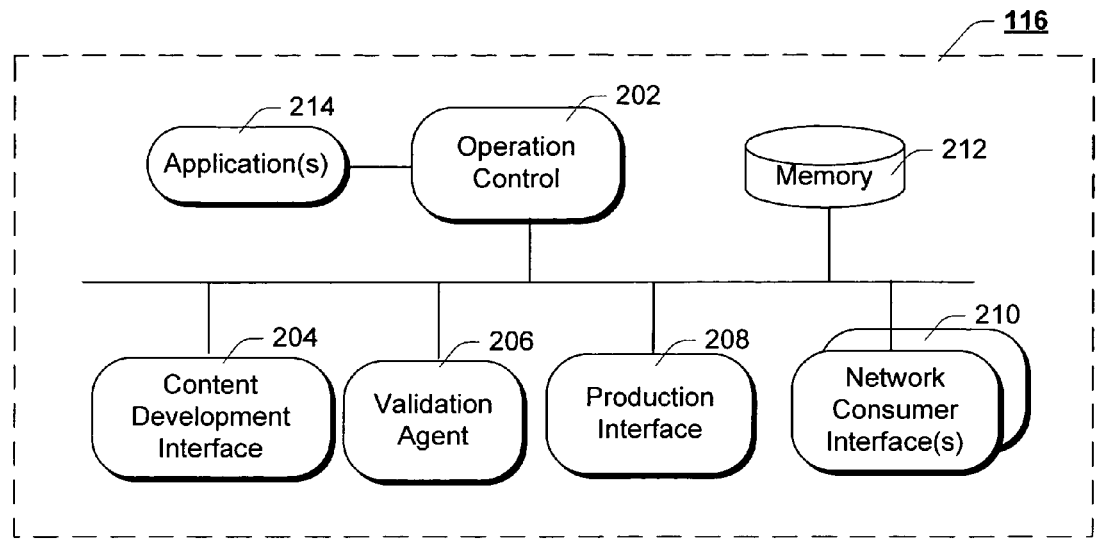
FIGS. 2A and 2B provide alternate embodiments of a secure content development system incorporating the teachings of the present invention.
Figure 2B:
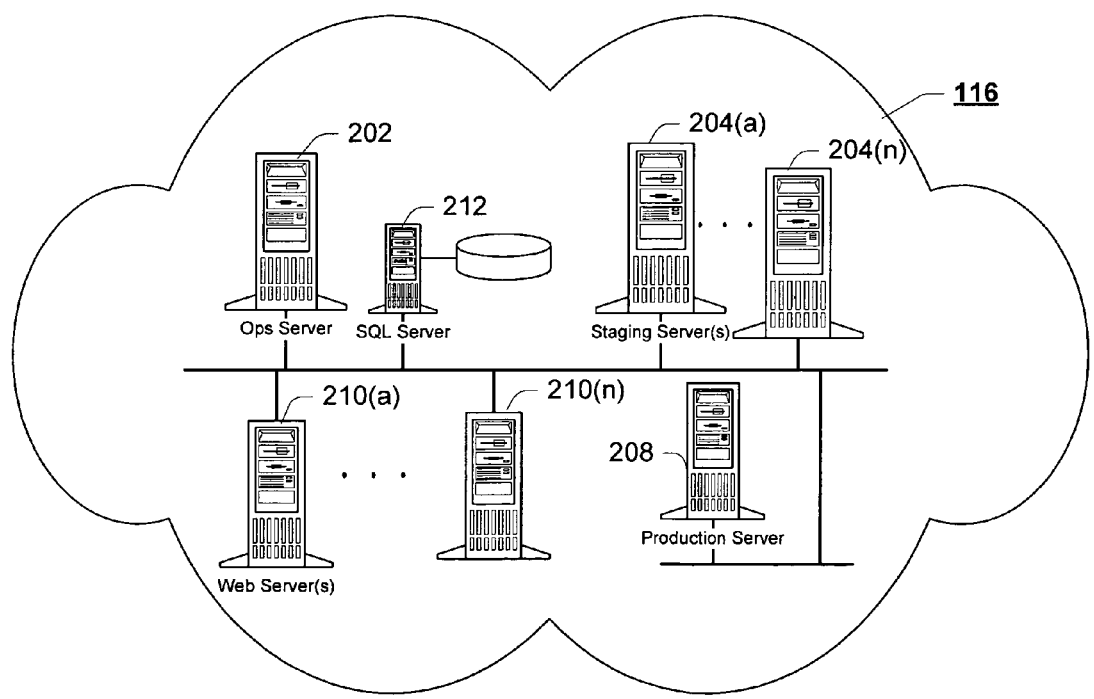

FIGS. 2A and 2B illustrate two embodiments of a secure third-party content development system 116 suitable for use within FSC 102 in accordance with teachings of the present invention. With respect to FIG. 2A, secure third-party development system 116 is shown comprising operational controller 202, content development interface 204, validation agent 206, a production interface 208, network consumer interface(s) 210, memory 212 and, optionally, applications(s) 214, operatively coupled as depicted. It is to be appreciated that although depicted as separate functional elements in a hardware paradigm, one or more of the elements may well be combined (e.g., content development interface 204 and validation agent 206) and these innovative functions may well be implemented (in whole or part) in software executing on a computing platform.

Third-party development of content depends heavily on the operational controller 202 to enable publishing of content, testing of content prior to production publication and overall management of a biller's presence on FSC 102. The operational controller 202 provides a biller administrator to manage the content development process on FSC 102. In this regard, operational controller 202 establishes a biller development account locally, to manage one or more third-party access accounts. For each biller development account, operational controller 202 establishes and manages one or more third-party development accounts, directories and access control lists (ACLs) established on content development interface 204 and production interface 208. In addition, the operational controller 202 receives client certifications (or "certs") for each third-party developer authorized by the biller to access secure development system 116, and maps such certs to ACLs on the content development interface 204 and the production interface 208. Moreover, once development is complete and the resulting content has been validated by validation agent 206, operational controller 202 receives and maps network address(es) associated with publication of the content (e.g., uniform resource locator (URL) addresses to the content web page) to a database of such network addresses, facilitating further testing and publication of the content.

Content development interface 204 provides a staging environment within secure development interface 116 where a developer can store content under development. In this regard, according to one embodiment, content development interface 204 is comprised of a hierarchy of directories roughly denoting a stage of development of content stored within the directories. According to one embodiment, content development interface 204 includes a "working" directory, a "validation" directory, and a "publication" directory. The working directory is where content under active development is maintained. Content that is ready for validation testing by validation agent 206 is moved to the validation directory. Content that is validated by validation agent is maintained in the publication directory until it is moved to the production interface 208 for publication. It should be appreciated that operational controller 202 limits access to the content of any directory to only those with a valid cert to access that content, i.e., currently authorized third-party developers, and FSC 102 technical/administrative support.

According to one aspect of the present invention, secure development system 116 includes an automated validation agent 206. It will be appreciated by those skilled in the art that there is a significant risk inherent in allowing third-parties to develop and publish content from FSC 102. A number of businesses, financial institutions and consumers rely on the integrity and security of the system. To address the concern of unauthorized access, secure development system 116 relies on registered certs to identify authorized development platforms (computer systems) for each biller development account. To address the concern of rogue or error-laden content bringing down the FSC 102, secure development system 116 utilizes an automated validation agent 206 to analyze the content before it is authorized for publication from FSC 102. In this regard, validation agent 206 analyzes a number of attributes of the developed content to ensure it is safe for publication.

Production interface 208 contains validated content created by third-party developers and FSC developers for testing and publication through FSC 102. In this regard, production interface 208 may be regarded as a file server storing and deploying content to consumers via one or more network consumer interface(s) 210. As with content development interface 204, content stored on production interface 208 is managed in working, validation and publication directories. The validation directory contains content with a limited publication, e.g., for consumer testing. Content in the publication directory is propagated to one or more network consumer interface(s) 210, which provide access portals to FSC 102 for consumers 104. According to one embodiment, consumer network interface(s) 210 are web servers.

FIG. 2B illustrates an alternate embodiment of example secure third-party development system 116. In accordance with the network diagram of FIG. 2B, secure development system 116 is comprised of a distributed network of servers implementing the features and functions described above. Accordingly, the reference identifiers used in FIG. 2A map to their functional equivalent in FIG. 2B.

Figure 3:
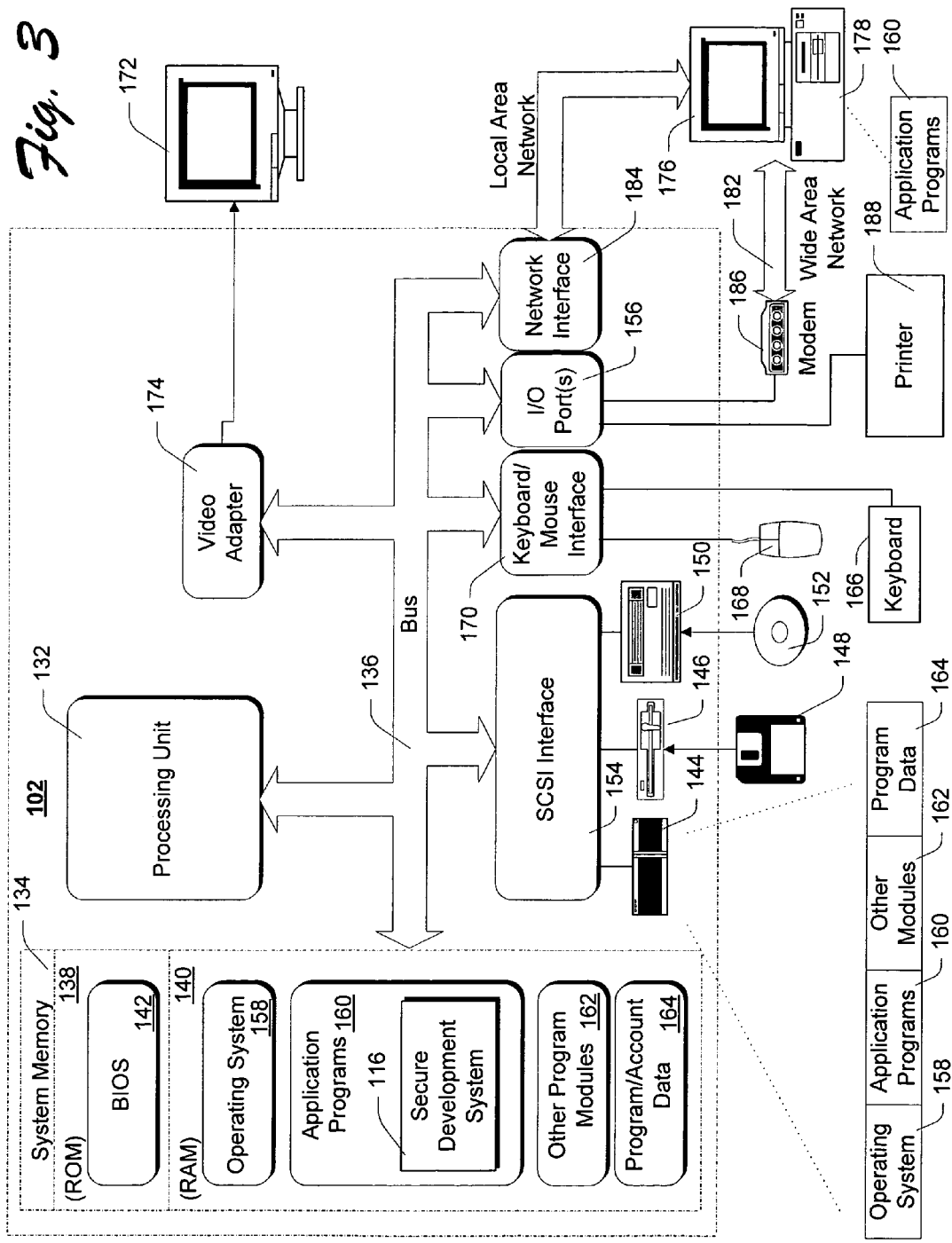
FIG. 3 is a block diagram of a computer system offering the features of the secure development system, according to one embodiment of the invention.

FIG. 3 illustrates an example computer system suitable for use as FSC 102 within the data network of FIG. 1. As used herein, but for the innovative secure development system 116, introduced above, computer system 102 is intended to represent any of a wide variety of general or special purpose computing platforms which implement the teachings of the present invention. It is to be appreciated that the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative secure development system 116 incorporating the teachings of the present invention, other program modules 162, and program data 164 (e.g., administrative and transactional information). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 3.

As shown, the logical connections depicted in FIG. 3 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a input/output (I/O) interface 156. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Content Authoring System

Figure 4A:
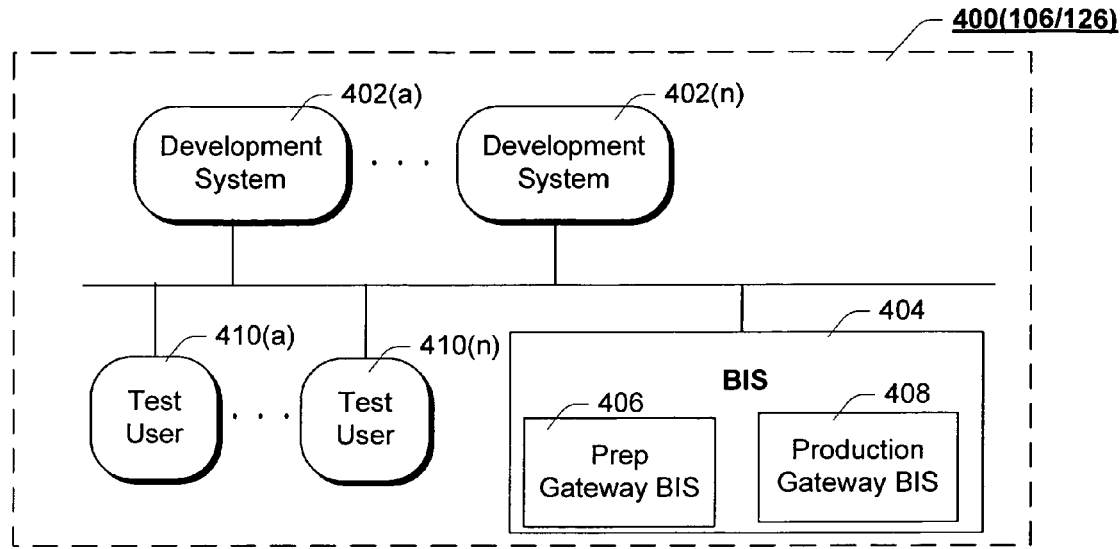
FIGS. 4A and 4B illustrate block diagrams of alternate embodiments of a third-party content development system, suitable for use within the data network of FIG. 1.
Figure 4B:
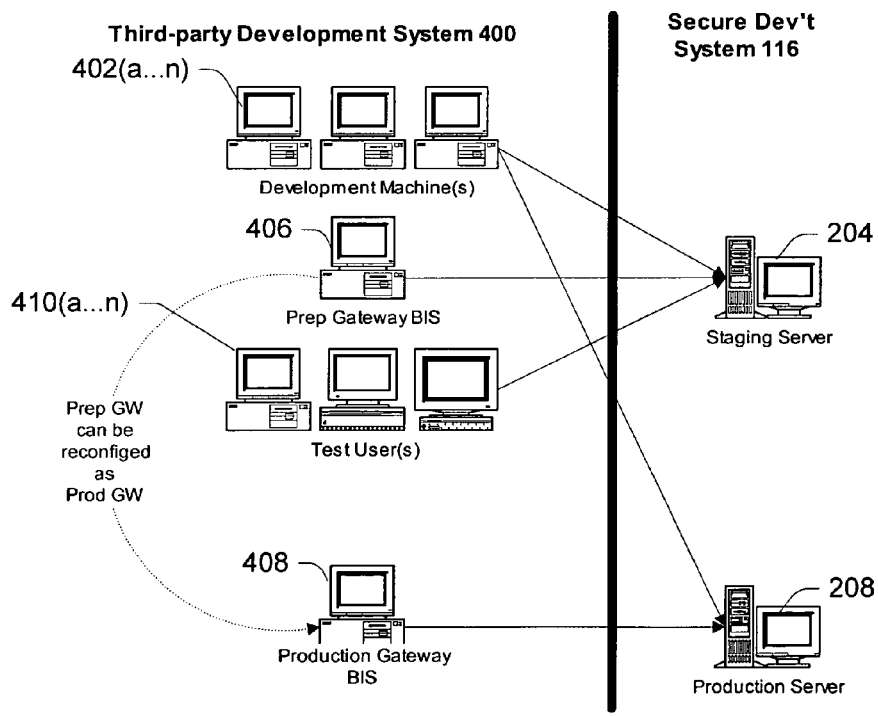

FIGS. 4A and 4B illustrate example content authoring systems, suitable for the development and publication of content through FSC 102. With reference to FIG. 4A, content authoring system 400 is comprised of one or more development platforms 402(*a-n*), a gateway billing integration system (BIS) 404 including a prep gateway BIS 406 and a production gateway BIS 408, and one or more user test platforms 410(*a-n*), operationally coupled as depicted. It will be appreciated that although depicted as separate functional elements according to a hardware paradigm, one or more elements (e.g., prep gateway BIS and production gateway BIS) may well be combined into a single element, and may well be comprised of software functions which, when executed, implement the innovative features described herein.

Development platform(s) 402(*a-n*) represent computing systems suitably endowed with content development software (e.g., FrontPage 2000 introduced above). According to one embodiment, each development platform 402(*a-n*) has a unique cert (not shown), which must be registered and have current authoring privileges in order to utilize the features of secure development system 116. According to one embodiment, offline development is supported wherein the developer downloads FSC implemented objects to development system 402 to develop customized content, e.g., an application server page providing Registration, Support, eForms, etc. Once local coding of the ASP is complete, the content is moved to secure development platform 116 from a development system with a current cert, to continue the validation and publication process.

As introduced above, the gateway BIS 404 provides a means of integrating legacy billing systems with FSC 102, enabling billers to leverage the legacy billing systems and data for use with the innovative FSC 102. A detailed description of the BIS is provided in the above referenced co-pending applications, which are included herein by reference.

The user test platforms 410(*a-n*) are intended to represent any of a number of computer systems 114 that a consumer may use to access and utilize the features of FSC 102. In this implementation as a test platform 410, the computer systems execute a test sequence designed to identify latent defects in the developed content. The user test platforms 410 access content located in the validate directory of the production interface 208 in performing this valuable function. Once the user test platforms 410 have satisfactorily completed their test sequences, the third-party developed content is promoted to the publication directory, and propagated to one or more web servers 210(*a-n*).

FIG. 4B illustrates an alternate embodiment of example content authoring system 400. In accordance with network diagram of FIG. 4B, content authoring system 116 is comprised of a distributed network of computing systems implementing the features and functions described above. Accordingly, the reference identifiers and description associated with the elements of FIG. 4A map to their functional equivalent in FIG. 4B.

Figure 5:
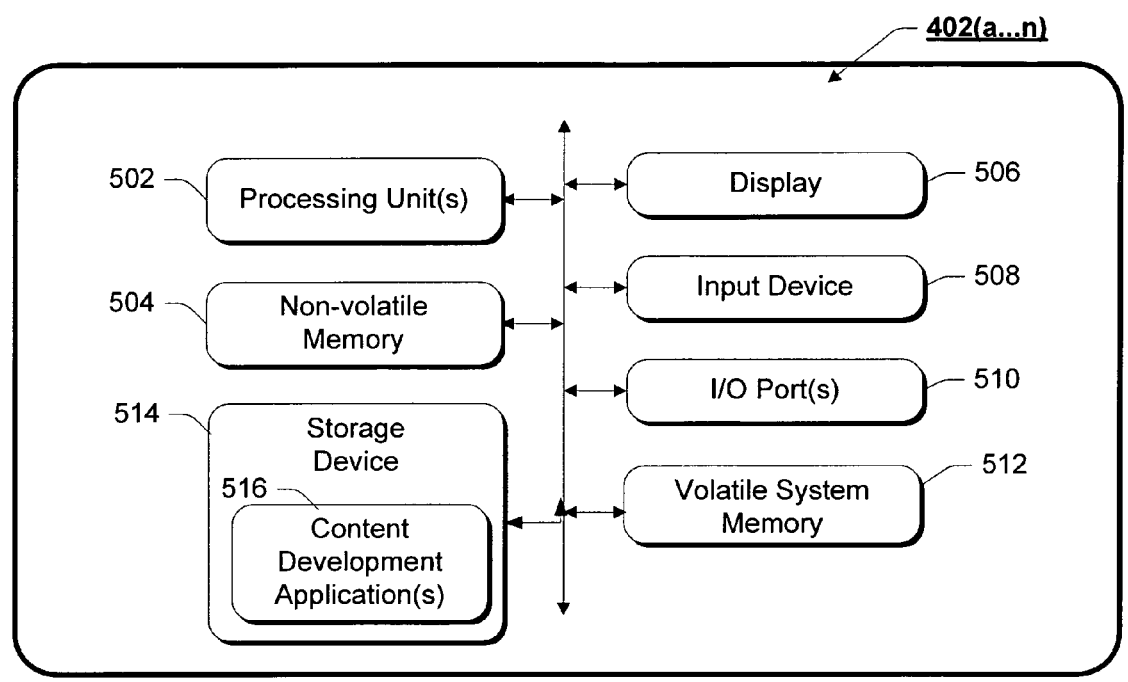
FIG. 5 illustrates a block diagram of an example computer system suitable for use to develop content within the third-party content development systems of FIGS. 4A and 4B.

FIG. 5 is a block diagram of an example computing device 402 suitable for use as a content authoring platform, according to one embodiment of the present invention. As shown, computing device 402 includes one or more processing unit(s) 502, a non-volatile memory device 504, a display device 506, an input device 508, input/output (I/O) port(s) 510, volatile system memory 512 and a storage device 514 including a content development application 516 (e.g., FrontPage 2000) which, when executed, enables a developer to generate content for publication via FSC 102.

As described above, except for its interaction with secure third-party development system 116 in developing publishable content for FSC 102, computer system 102 is intended to represent a wide variety of computing devices known in the art. Similarly, the functional blocks 502-516 shown in FIG. 5 are each intended to represent any of a plurality of devices that perform these functions and, thus, need not be described further.

Example Data Structure

Figure 6:
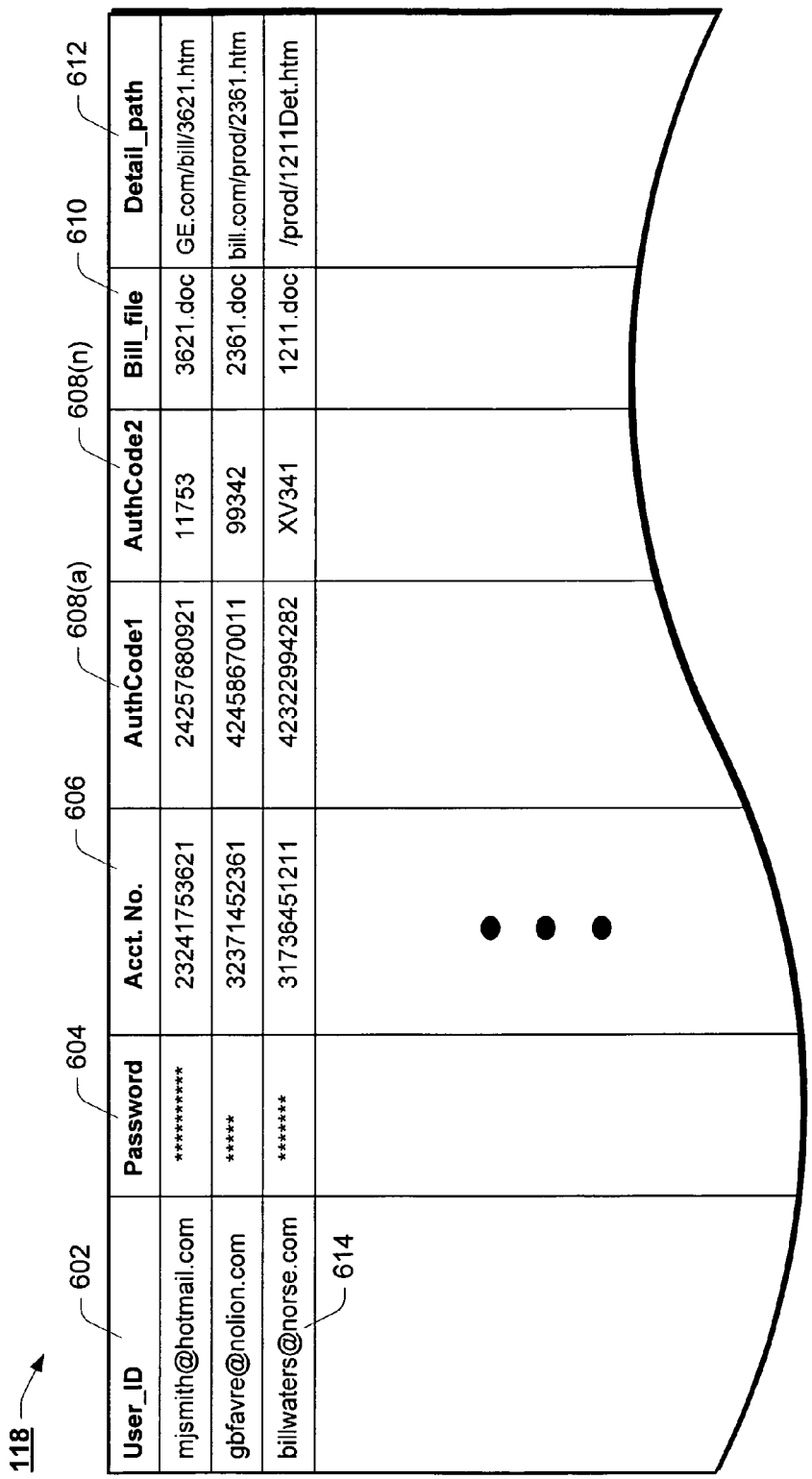
FIG. 6 graphically represents an example data structure to store authentication codes and bill data facilitating a seamless transition between the financial service center and the biller to present the user with requested bill detail.

FIG. 6 graphically illustrates an example data structure 118 suitable for use with secure development system 116 and FSC 102. As shown, data structure 118 is comprised of a number of fields including one or more of a user_ID field 602, password information field 604, one or more financial institution account numbers 606, one or more authentication code fields 608(*a-n*), a billing summary filename field 610 and a field containing a path to detailed billing information (Detail_Path) 612. It will be appreciated that, data structures 118 of greater or lesser complexity may well be used without deviating from the spirit of the present invention.

As used herein, the user_ID field 602 and the password information field 604 enable FSC 102 to verify the identity and authenticity of a user requesting access to an account. In this regard, the user_ID/password combination must be unique to a single individual. A number of user_ID and password criteria may be used to satisfy the uniqueness criteria. In one implementation, for example, a user's Microsoft Passport ID (email address/password combination) are used to uniquely identify the individual. Although not shown, the data structure 118 may also contain fields for additional user information such as, for example, an address, a telephone number, and/or additional credit history information (not shown).

The financial institution account numbers 606 provide a link to the asset-backed accounts of a bank, brokerage, etc., that store the financial assets to cover the financial transactions of the user. In this regard, the financial institution (FI) accounts are intended to represent any of a wide variety of such accounts known in the art including, but not limited to, savings accounts, checking accounts, money market accounts, brokerage accounts and the like. In one embodiment, the email system 102 provides its users with an FI account (i.e., an integrated email/FI account), enabling users to deposit and withdraw funds from the email account itself.

According to one aspect of the invention, the authentication codes 608(a-n) are used to provide the seamless integration of FSC 102 hosted content with content hosted by the biller 106, or some other third party (e.g., a technical support consultant). To provide automated redirection to and authentication at a billers site, consumer user interface 120 (authored by FSC or some third-party) is configured to transmit the authentication codes (or equivalents) to the billers computing system. According to one implementation, the authentication codes are supplied to FSC 102 along with summary bill information in a batch billing statement downloaded to FSC (according to the thin batch bill schema introduced above). In an alternate embodiment, the use of authentication codes is eliminated through the use of a dual sign-in procedure, wherein the user first signs on to the FSC 102, and then must subsequently sign on to the biller's computing system 106 when redirected for display of detailed bill data (for example).

The summary bill file field 610 identifies the name of a file wherein summary bill data for the associated account is found. According to one implementation, this information is provided in the batch billing statement and stored in a file on FSC 102. In an alternate embodiment, summary bill file field 610 includes path information to identify a remotely located file containing the summary bill information.

The detail_path field 612 identifies the path to detailed billing information. According to the teachings of the present invention, introduced above, the detailed billing information may well be hosted on a remote, third-party server (e.g., associated with the billers computing system 106).

Example Operation and Implementation

Having introduced the architectural and functional elements of the present invention with reference to FIGS. 1-6, the operation secure third-party development system 116 and implementations of biller authored and/or hosted content is presented with reference to the remaining FIGS. 7-15.

Example Third-party Content Development

Figure 7:
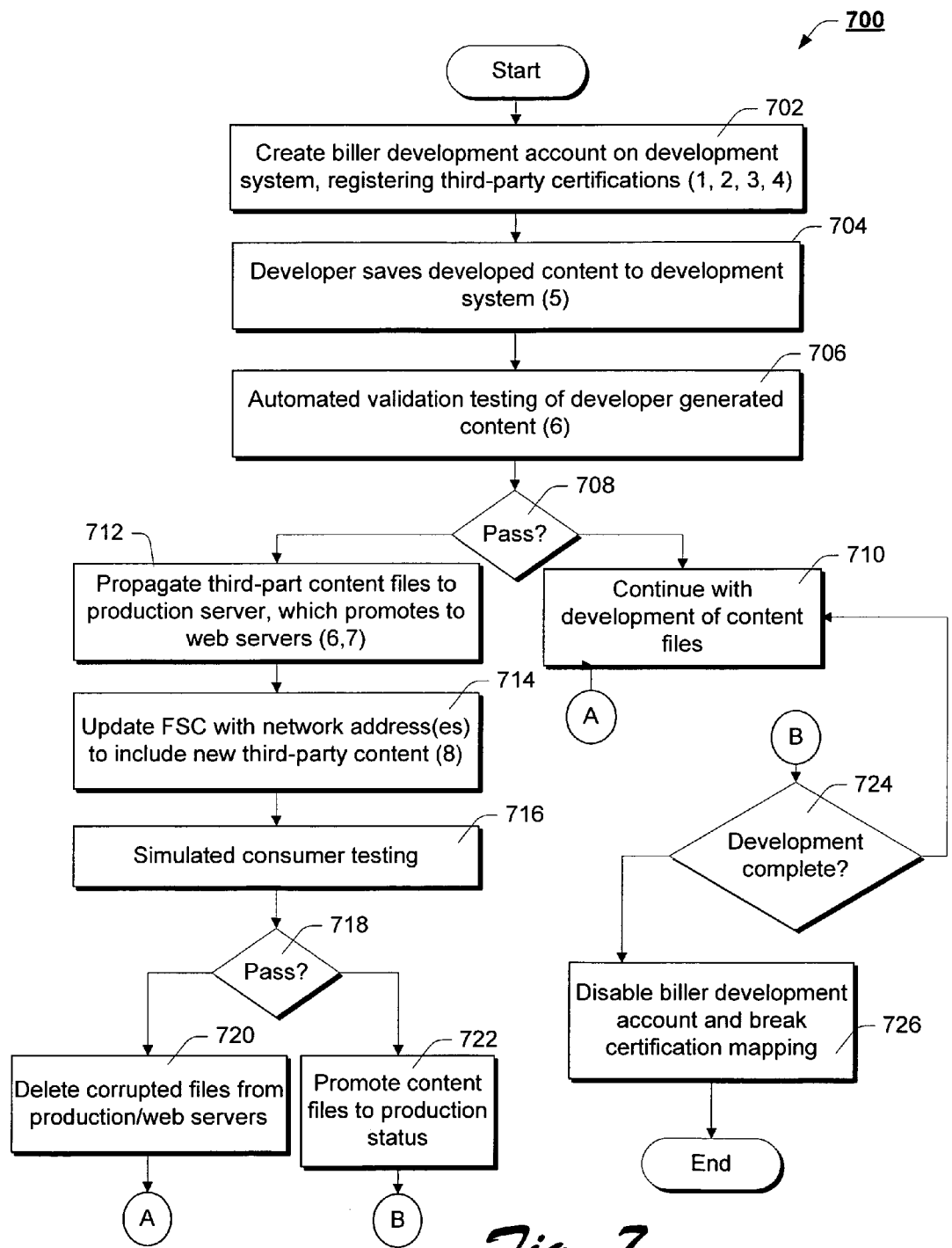
FIG. 7 is a flow chart of an example method facilitating third-party content development within the financial service center of FIG. 1.

FIG. 7 illustrates a flow chart of an example method for secure third-party development of FSC content, according to one embodiment of the invention. As shown, the method begins with block 702, wherein a biller development account is created on secure development system 116. More specifically, a biller administrator accesses ops server 202 to establish a biller development account. In response, ops server 202 creates development accounts and directories, and updates access control lists (ACLs) on staging server 204 to facilitate such development. Before a developer can begin using the secure development system 116, however, biller administrator must add the certs uniquely identifying authorized third-party developers to the ACLs.

In block 704, third-party developers save developed content to appropriate directories in development system 116. That is, depending on the stage of development, a third-party content developer saves their developed content in a working, validation or publication directory of staging server 204. According to one embodiment, staging server 204 includes the working, validation and publication directories for each of a number of FSC supported applications such as, for example, Registration services, Support services, electronic Forms content, and the like.

In block 706, once initial coding is completed, the developed content is promoted from the working directory to a validation directory to facilitate validation testing of the third-party developed content. As introduced above, secure development system 116 invokes an instance of automated validation agent to automatically identify errors in the third-party developed code. According to one embodiment, automated validation agent 206 analyzes the developed content for ASP errors, and other objects the execution of which could compromise FSC 102, other billers 106, or consumers 104.

In block 708, validation agent 206 determines whether the analyzed content is acceptable. If not, the third-party developer (e.g., 126) and/or associated biller 106 is notified, and development continues to eliminate the identified errors with block 710.

If, in block 708 validation agent determines that the developed content is acceptable, the content is propagated at block 712 to a working directory for that content on the production server 208, which also populates one or more web server(s) with the content for consumer testing. Before further consumer validation testing may be performed, ops server 202 must be given network address(es) to map to the newly developed content, at block 714. In response, ops server 202 provides the network address information to SQL server 212, which updates its database of network addresses.

In block 716, simulated consumer testing is performed by user test platforms 410(a-n) to identify any latent problems that a consumer might encounter using the third-party developed content. If problems are identified, the files are automatically removed from the production and web servers at block 718, as the debug process continues from the working directory of the staging 204 or production 208 servers. Note, validation testing of modified content may be required before the developed content can be promoted to and propagated from the production server 208, or before additional consumer testing.

If the consumer testing of the developed content failed to identify any errors at block 718, the developed content is promoted to the publication directory of the production server 208, and is ready for production status at the authorization of the biller administrator. According to certain implementations, additional manual controls may restrict production publication of newly developed third-party content until FSC technical/administrative staff have manually reviewed the content, e.g., using consumer test platforms 410. If errors are identified at block 718, the corrupted files are deleted from the production/Web servers at block 720.

In block 724, upon successful development and validation of content (722), ops server 202 determines whether development for the associated biller is complete. According to one embodiment, ops server 202 will prompt biller 106 with a question of whether to extend the authorization of biller development account (and associated certs). If, in block 724 ops server determines that development is not complete, the development process continues with block 710.

If development is complete at block 724, ops server 202 disables the biller development account and breaks all cert mapping at block 726. According to one embodiment, ops server changes the password and privileges associated with the biller development account, forestalling any further access by biller or associated third party developers. In addition, ops server 202 removes the associated certs from ACLs associated with the biller.

FIG. 8 graphically illustrates an example graphical user interface (GUI), projected by ops server 202, facilitating management of secure development system 116. As shown, GUI 800 is a web page projected by an ops server 202 of secure development system 116 with links to invoke one or more of the functions discussed above. According to the illustrated example embodiment, GUI 800 includes links to enable a biller administrator to change their ops site password (802), register a publishing cert (804) for a third-party developer, customize the site (806) with developed content (e.g., Registration services, Support services, Bill presentment, etc.), and to debug (validate) (808) developed content.

FIG. 9 illustrates a GUI facilitating publication of a cert, projected to a biller administrator in response to selection of link 804. According to the illustrated embodiment, ops server 202 instructs an operating system of development platform 402 to project a user interface denoting the certs associated with the platform 402. GUI 900 allows the user to select an appropriate cert, if more than one is available, for use with secure development system 116. GUI 902 is displayed once a valid cert is provided and registered with ops server 202.

Figure 10:
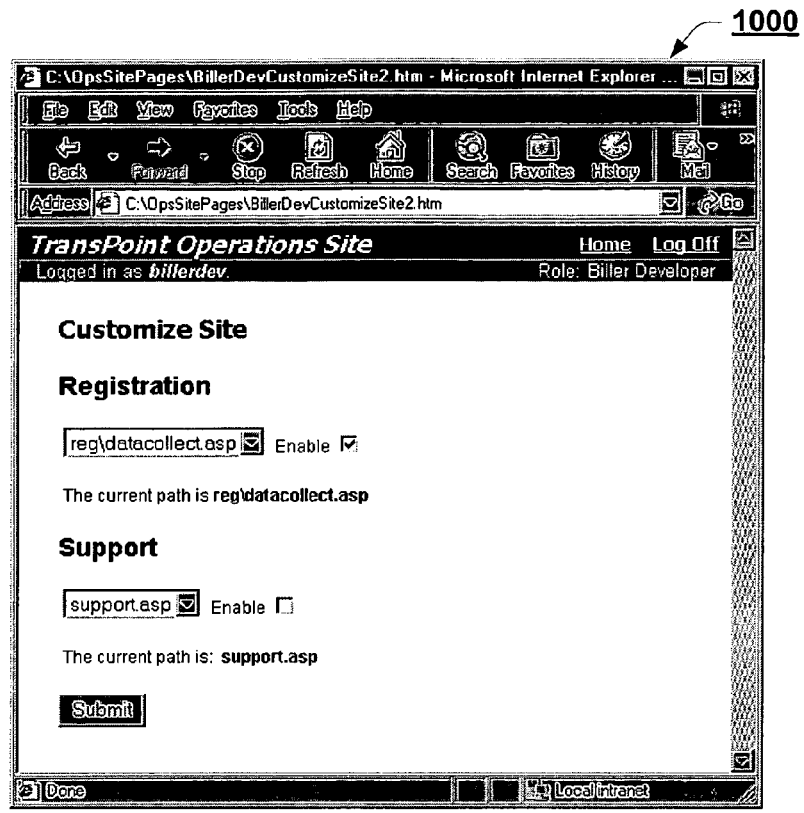
FIG. 10 graphically illustrates an example user interface enabling a biller to customize their presence on the financial service center to utilize their own custom developed content.

FIG. 10 graphically illustrates a GUI 1000 enabling an authorized biller administrator to customize the biller's FSC site, according to one embodiment of the present invention. As shown, the GUI 1000 enables a user to identify and enable customized registration and support content, in addition to the bill detail content.

Figure 11:
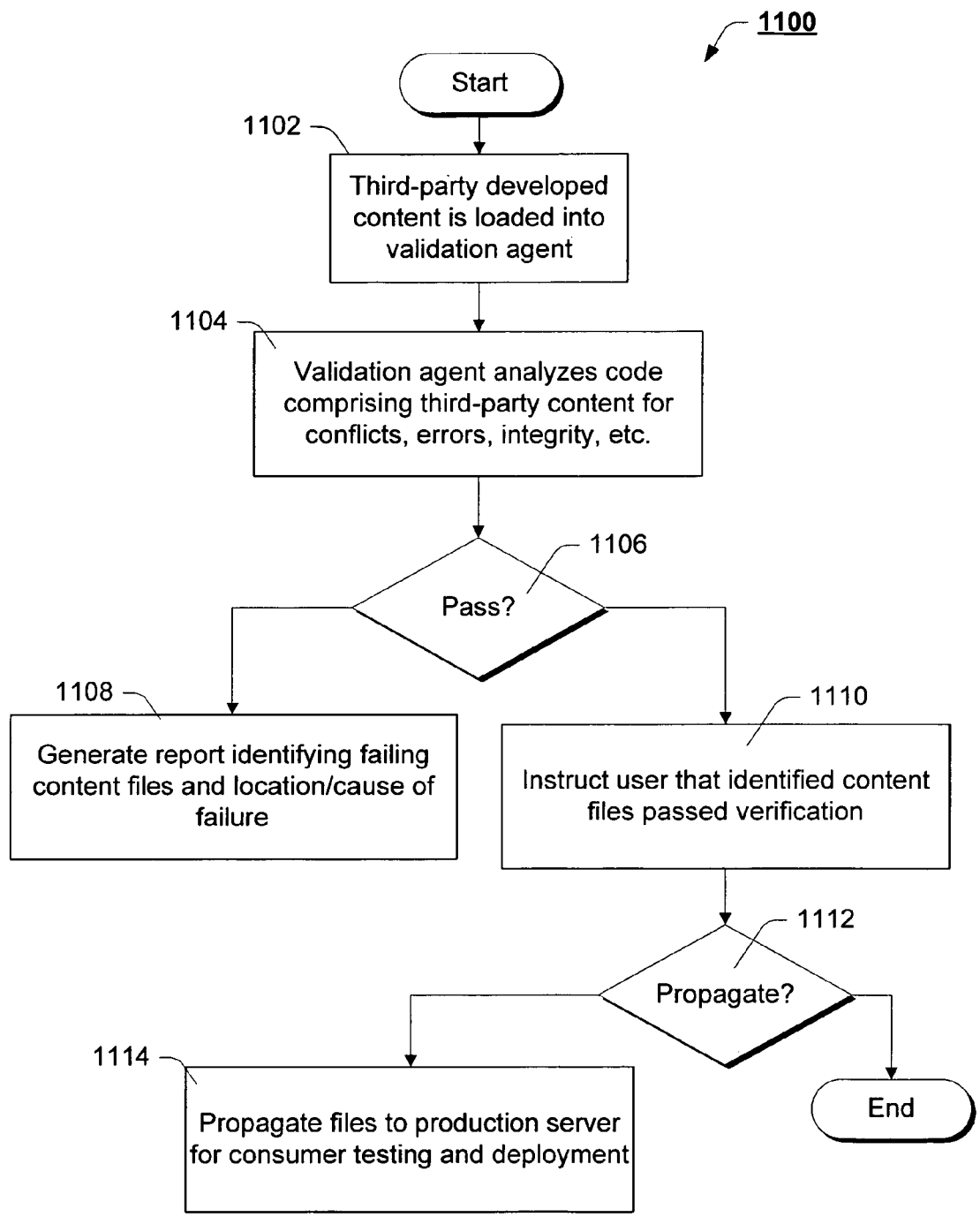
FIG. 11 is a flow chart of an example automated validation method to validate the integrity of third-party developed content before it is propagated beyond a working directory of the secure development system.

FIG. 11 illustrates a flow chart of an example method for validating third-party developed content, according to one embodiment of the invention. As shown, the method begins at block 1102 with invocation of validation agent 206 by a developer or biller administrator. In block 1104, validation agent 206 analyzes code comprising the third-party content for conflicts, ASP errors, security problems, etc., and makes a determination in block 1106 whether the content is technically error free.

If the content contains errors, validation agent 206 generates a report identifying failing content files and the location and cause of the failure at block 1108. In addition, as introduced above, validation agent 206 deletes the files from the validation directory of the staging server 204.

If, in block 1106, validation agent 206 determines that the third-party content is free from ASP and other errors, validation agent 206 instructs the user that the content passed validation testing at block 1110. According to one embodiment, validation agent will prompt the developer or biller administrator whether they wish to promote the validated files to the production server and propagate the files to the web server(s), at block 1112. If so, the files are so promoted and propagated by the validation agent 206 at block 1114.

According to an alternate embodiment, validation agent 206 automatically performs file management services, promoting validated files to the production server for propagation and deleting the files from the validation directory. Such an embodiment provides for improved file management practices, lessening the probability that stale files are forgotten in the validation directory.

Figure 12:
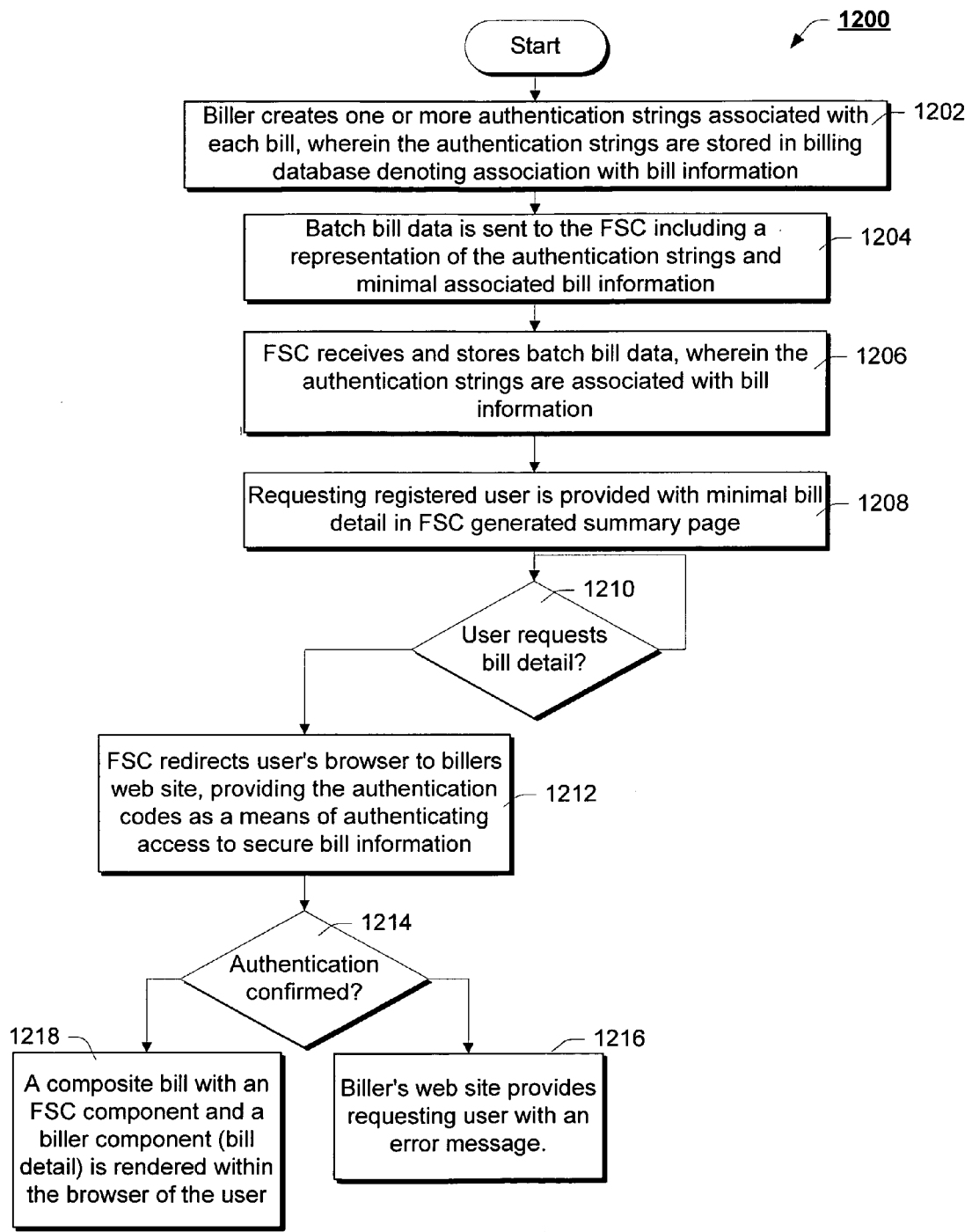
FIG. 12 is a flow chart of an example method for utilizing third-party developed and/or hosted content within the financial service center.

FIG. 12 is a flow chart illustrating a method for biller authored and hosted content, according to one embodiment of the present invention. As shown, the method begins with block 1202, wherein the biller 106 creates one or more authentication strings associated with each bill to be submitted to FSC 102 in a batch billing statement. The created strings are stored locally in a billing database (not shown) maintained by the biller system.

In block 1204, the batch billing data including at least a representation of the authentication strings is sent to FSC 102. According to one embodiment, introduced above, the batch billing data adheres to a thin batch billing schema, wherein minimal information is provided to the FSC 102 in the batch billing statement, thereby reducing the amount of confidential information that is transmitted outside biller system 106. According to one embodiment, only a biller identifier, summary bill data including a consumer identifier, and the authentication codes are sent in the thin batch billing schema.

In block 1206, FSC 102 receives the batch billing data and populates transactional records in storage device 118. More specifically, with reference to FIG. 6, for each consumer ID/Biller ID combination, a record 614 is entered into data structure 118.

In block 1208, a requesting registered user is provided with minimal bill detail in an FSC generated summary page. From this summary page, the registered user could pay the bill, completing the transaction without any further review of bill data. If, in block 1210, the user requests detailed bill information, the summary page (authored either by FSC 102, biller 106, or third-party developer 126 to denote biller hosted bill-detail), FSC 102 redirects the user's browser to billers system 102 providing the authentication codes as a means of authenticating the registered user's access to the requested detailed billing information, at block 1212. According to one embodiment of the invention, the redirection to and authentication with the billers system is hidden from the view of the registered user. According to one implementation, FSC 102 provides the user with an indication that the requested information is being retrieved.

If, in block 1214, billers system is unable to authenticate the registered user given the provided authentication strings, billers system 106 rejects the access request, and FSC 102 provides the user with an error message at block 1216. Alternatively, if billers system 106 authenticates the registered user, a composite billing user interface is generated comprising FSC generated content and biller generated content, at block 1218.

Alternatively, if billers system 106 authenticates the registered user, a composite billing user interface is generated comprising FSC generated content and biller generated content, block 1218.

Figure 13:
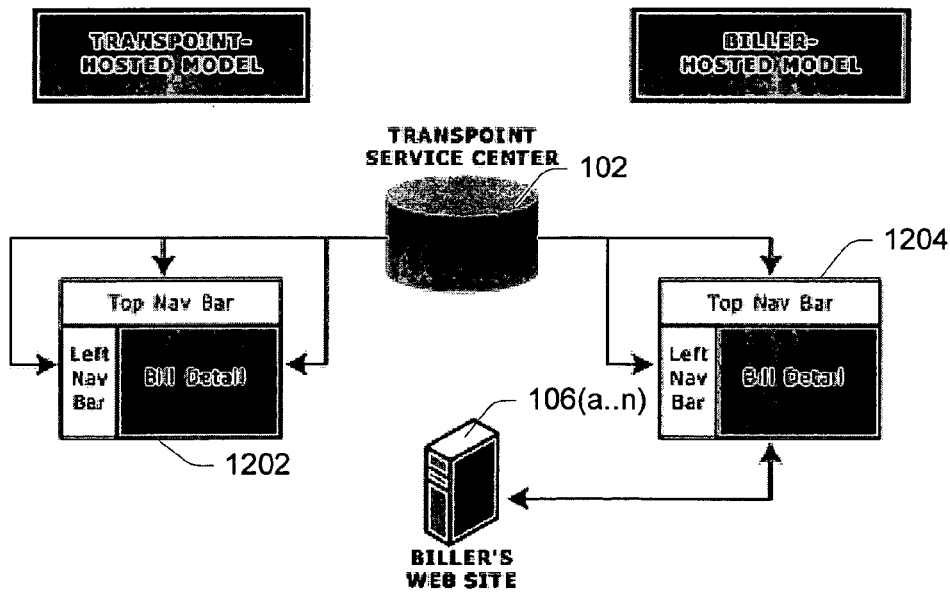
FIG. 13 is an architectural representation of a financial service center presenting a consumer with content including a financial service center component and a third-party developed and/or hosted component, according to the teachings of the present invention.

FIG. 13 provides an architectural dependency perspective on biller authored and biller hosted content, according to the teachings of the present invention. As shown, FSC 102 minimally provides navigation aids 1204, e.g., a top navigation/function bar and a left navigation/function bar. In the biller authored model, at least a subset 1202 of the content is developed by biller 106. In one embodiment, the content may be authored by a third-party developer but stored and projected by FSC 102. Alternatively, FSC 102 and billers site 106 may cooperatively work to provide composite content including an FSC authored and hosted component (1204) and a biller authored and hosted component 1202.

Figures 14, 15:
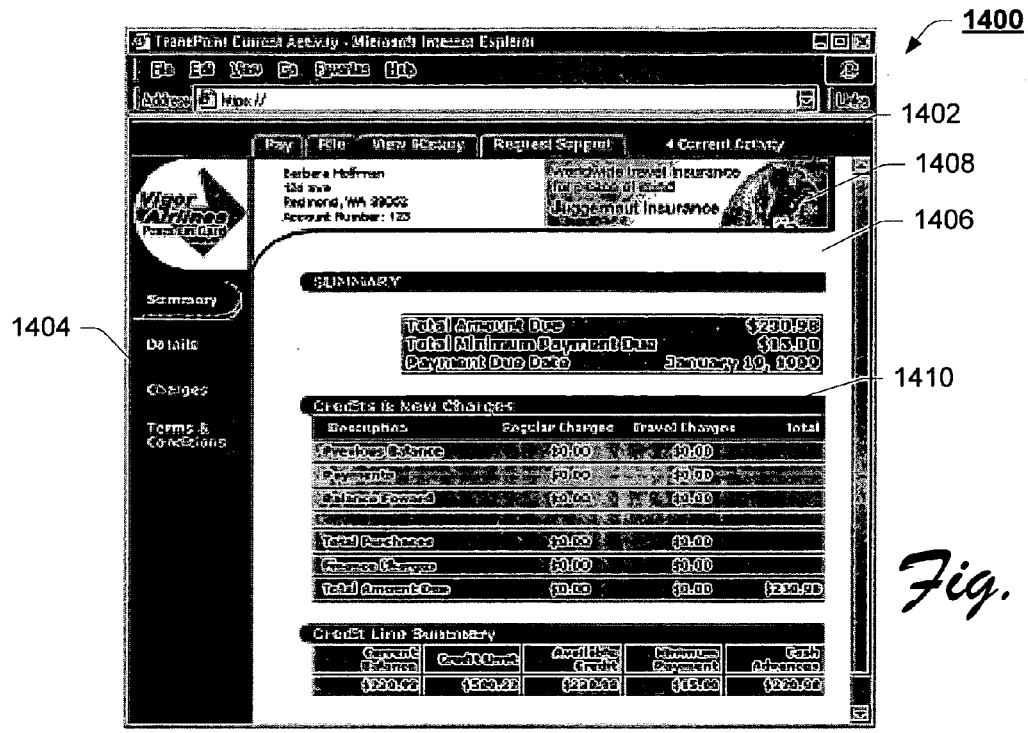
FIG. 14 graphically illustrates an example bill summary page, according to one embodiment of the present invention.
FIG. 15 illustrates an example bill detail page, according to one embodiment of the present invention.

FIG. 14 graphically represents an example bill summary user interface (UI) 1400, according to one embodiment of the present invention. As shown, the UI includes a top navigation/function bar 1402 and a left navigation/function bar 1404. As introduced above, these elements are authored and hosted by FSC 102. In addition, UI 1400 includes lower frame 1406, which includes an advertising banner 1408 and bill summary information 1410. According to one embodiment, the lower frame 1406 is authored by biller 106, but hosted from FSC 102. There may be a number of advantages to hosting summary pages from FSC 102. First, by hosting summary page UI 1400 from FSC 102, it protects the consumer (and the biller) from an unavailable biller computer system. That is, if the biller system 106 goes down, a consumer would be unable to access their account. If the information is hosted by FSC 102, and if the biller computer system 106 goes down, the consumer can still complete payment transactions without having to access the billers site (e.g., to review detailed information).

FIG. 15 graphically illustrates an example detailed billing user interface 1500 with an FSC-hosted component and a biller-hosted component, according to one embodiment of the present invention. As shown, the navigation/function bars 1402 and 1404 are hosted from FSC 102, while the detailed bill information 1502 is hosted from billers computer system 106.

It is to be appreciated, given the foregoing discussion, that the innovative secure third-party development system 116 facilitates third-party authoring and/or hosting of content via FSC 102. Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. An electronic billing statement presented as a user interface (UI), the electronic billing statement comprising:
   a first component hosted by a financial service center on a Web server, the first component to:
      navigate the user interface (UI);
      invoke one or more functions of the financial service center; and
      provide summary billing information; and
   a second component hosted by a third-party, the second component to provide detailed billing information from a biller to a user of the financial service center on the Web server, wherein the second component is only provided to the user upon verification of user authorization to receive the detailed billing information,
   wherein the financial service center receives batch bill information along with authentication strings from the biller.

2. An electronic billing statement according to claim 1, wherein the authentication strings are sent to the third-party to authorize delivery of the second component.

3. An electronic billing statement according to claim 1, wherein each of the financial service center and the third-party independently create the electronic billing statement on the Web server.

4. An electronic billing statement according to claim 1, wherein the electronic billing statement is comprised of a plurality of executable instructions sent from the financial service center and the third-party for rendering in a browser executing on a user computing system.

5. A storage medium encoded with a plurality of executable instructions which, when executed, render an electronic billing statement, the electronic billing statement comprising:
   a first component hosted by a financial service center on a Web server, the first component to:
      navigate the user interface (UI);
      invoke one or more functions of the financial service center; and
      provide summary billing information; and
   a second component hosted by a third-party, the second component to provide detailed billing information from a biller to a user of the financial service center on the Web server, wherein the second component is only provided to the user upon verification of user authorization to receive the detailed billing information,
   wherein the financial service center receives batch bill information along with authentication strings from the biller.

* * * * *